Patented Dec. 2, 1930

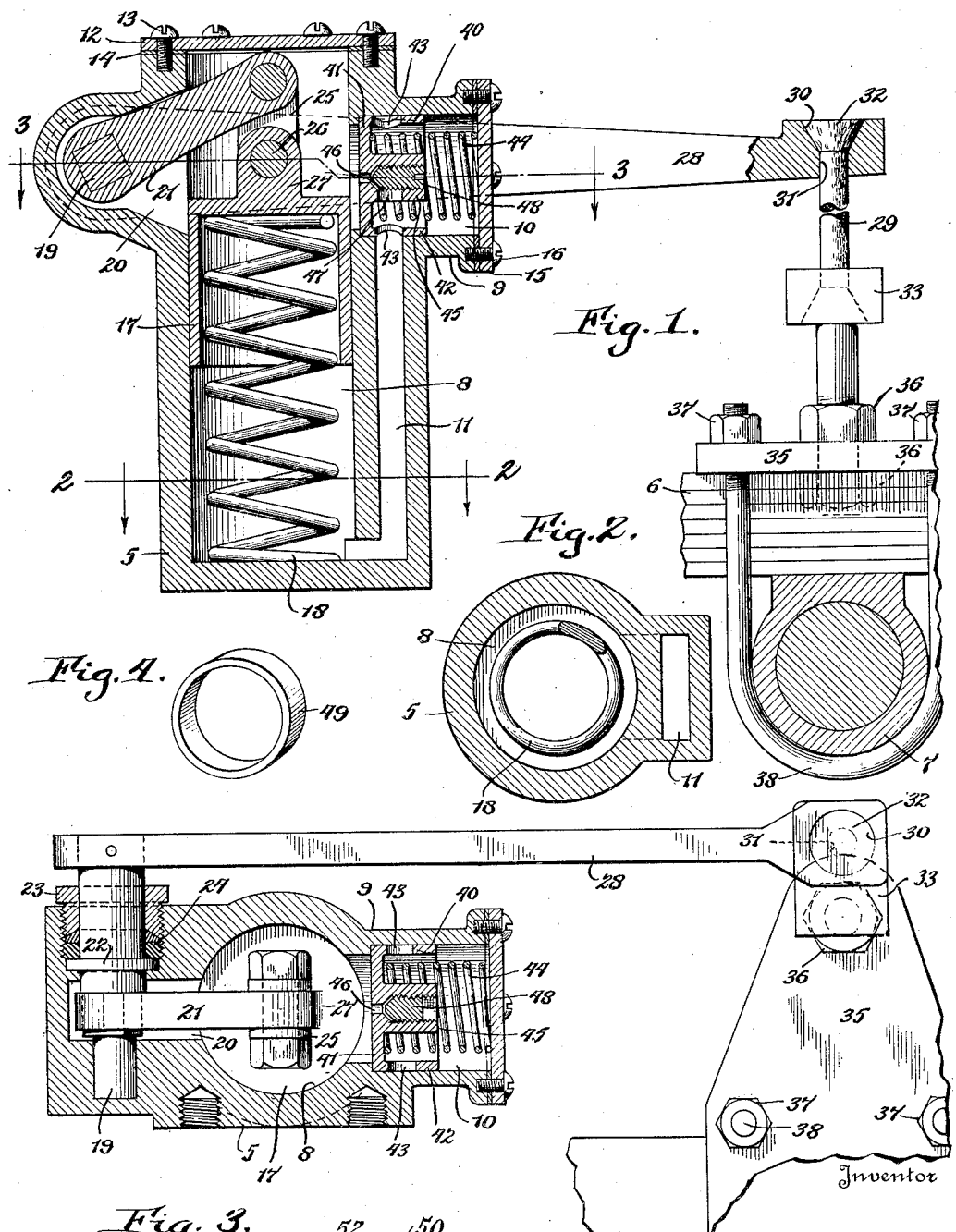

1,783,388

UNITED STATES PATENT OFFICE

VINCENT PATRICOLO, OF BUFFALO, NEW YORK

SHOCK ABSORBER

Application filed March 2, 1928. Serial No. 258,570.

This invention relates to a shock absorber, and more particularly to a fluid or hydraulic shock absorber which is designed for the purpose of cushioning or absorbing the shocks imparted to spring supported vehicles when traveling over rough or uneven roads.

The principal object of this invention is to provide a hydraulic shock absorber which is simple in construction and is extremely sensitive in action so as to readily yield when the automobile is traveling over a slightly uneven roadway, but will act with powerful checking force upon the rebound of the automobile spring when traveling over ruts or pronounced projections in the roads. When such a depression is encountered the combined effect of the depression, and the rebound action of the spring normally tends to throw the car up into the air, with consequent discomfort to the passengers and wear upon the automobile, and it is therefore primarily the object of this invention to provide a shock absorber which will lessen the rebound action of the vehicle springs and therefore render the riding of the automobile smoother.

With certain types of automobiles it has been found desirable to provide what is known as a double acting shock absorber in which both the compression and the rebound action of the spring is retarded, and for this purpose the present invention proposes a simple and effective method of providing either a single acting or a double acting shock absorber.

Another aim is to provide a simple and inexpensive connection between the operating arm of the shock absorber and the vehicle spring.

Still further objects are to provide such a shock absorber which can readily be applied to standard automobiles now in use, which is simple and inexpensive in construction, and which is reliable in operation and will not get out of order, and which will stand up under the severe uses to which accessories of this character are subjected.

In the accompanying drawings:—

Figure 1 is a vertical section through the shock absorber casing or housing and showing the manner in which the same is attached to an automobile spring.

Figure 2 is a horizontal section taken on line 2—2 of Fig. 1.

Figure 3 is a horizontal section taken on line 3—3 of Fig. 1.

Figure 4 is a perspective view of a collar which is designed for blocking the action of certain parts of the shock absorber and rendering it a double acting shock absorber.

Figure 5 is a modified form of connection between the operating arm of the shock absorber and the cable securing it to the spring structure.

Similar characters of reference indicate like parts in the several views of the drawings:—

In Fig. 1 the shock absorber is shown as applied to one of the rear springs of an automobile although it will be understood that an absorber is provided for each of the springs of the vehicle.

The housing or casing 5 of the shock absorber is adapted to be attached to the frame or chassis of the automobile and is suitably connected as hereinafter described to the spring 6 to which is attached the usual axle housing 7. The shock absorber housing 5 is formed to provide a vertical cylindrical bore 8, a transverse cylindrical portion 9 which projects outwardly from the housing and has a bore 10 of which communicates with the vertical cylinder 8, and a by-pass 11 which communicates at its upper end with the horizontal cylinder 10 and at its lower end with the lower part of the vertical cylinder 8. The lower end of the vertical cylinder 8 is closed and the upper end of this cylinder is closed by a head 12 which is removably secured to the housing by screws 13 or in any other suitable manner, suitable provision such as a gasket 14 being provided to prevent the loss of the oil or other fluid with which the shock absorber is completely filled. A similar removable head 15 is provided at the outer end of the horizontal cylinder 10 and is similarly secured to the housing by screws 16 or in any other suitable manner.

Within the vertical cylinder 8 is arranged a piston 17, the downward action of which is resisted by a relatively heavy compression spring 18 which is interposed between the piston and the bottom of the cylinder. The housing 5, as shown in Figs. 1 and 2, is extended outwardly on the side opposite the horizontal cylindrical projection 9 and journals a rock shaft 19. This rock shaft extends through a passage 20 which opens into the cylinder 8, and carries a rock arm 21 which projects into the cylinder 8 and is adapted to actuate the piston 17.

For the purpose of securing the rock shaft and rock arm, the rock shaft is preferably squared, as best shown in Fig. 1, and the opening in the rock arm is similarly squared so that these two members are compelled to move together. To prevent outward displacement of the rock shaft and also to prevent the loss of oil, the rock shaft is provided with a shoulder or collar 22, and a stuffing box or gland 23 is provided which compresses a suitable packing 24 against this collar. To the outer end of the rock arm 21 is pivotally secured a pair of vertical links 25 which at their lower ends are secured to a pin 26 which passes through an ear 27 formed on the upper side of the piston 17. In this manner when the rock shaft is rocked, the piston is reciprocated. To the outer end of the rock shaft 19 is suitably pinned an arm 28, and the outer end of this arm is connected to the vehicle spring by means of a flexible metal strap or cord 29. The connection of this cord to the arm is preferably provided by forming a conical depression 30 in the upper outer end of the arm 28 and an opening 31 at the lower end of this depression. The cord 29 is passed up through the opening 31, the strands at the upper end of this cord are frayed and babbitt 32 or other suitable metal is then poured into the conical depression so as to securely unite the cord and the arm. A similar connection is made between the lower end of the cord 29 and an ear 33. This ear is formed to provide a threaded stem 34 which projects downwardly through a plate 35 and is secured thereto by means of a pair of nuts 36 on opposite sides of this plate. The plate may be secured to the vehicle springs by removing the nuts 37 of the usual U-bolt 38 which unites the axle and spring, placing the plate over these U-bolts, and then replacing the nuts 37. In this manner when the spring has been compressed the rebound action of the same will depress the arm 28, and will consequently depress the rock arm 21 and the piston 17.

It therefore follows that to resist the rebound action of the springs but allow free compression of the same, the downward movement of the piston 17 must be retarded and the upward movement of the same must be free.

For the purpose a piston or plunger 40 is arranged in the horizontal cylinder 10, this plunger including a head 41 at its inner and side walls 42 which are provided with a plurality of ports 43, which ports, in the inward position of the plunger, register with the by-pass 11. A plurality of such ports are provided so that in all rotary positions of the plunger 40 one of such ports will register with the by-pass. This plunger is yieldingly held against a shoulder at the inner end of the cylinder by means of a compression spring 44 interposed between the plunger and the head 15 at the outer end of the cylindrical portion 9.

The plunger is formed to provide an internally threaded central stem 45, and a restricted port 46 is provided which extends between the interior of this stem and the vertical cylinder 8. A similar port 47 is provided between the interior of this stem 45 and the interior of the plunger 40. Regulation of the flow of oil through these ports and the interior of the stem is effected by means of a screw plug 48 which is formed at its inner end to provide a conical face which engages a seat at the inner end of the stem 45 and around the port 46.

It therefore follows that when the piston is forced downwardly due to a rebound action of the springs 10 that the oil with which the casing is filled will be forced from the lower end of the cylinder 8 through the by-pass 11, port 43, port 47, past the screw plug 48 and through the restricted port 46 into the cylinder 8 on the upper side of the piston 17. Inasmuch as the screw plug 48 is regulated to secure a highly restricted passage through the restricted port 46, the downward movement of the piston will be resisted by the body of oil which must be forced through this port and the rebound action of the spring is thereby checked. When, however, the piston 17 is moved upwardly during a compression action of the springs, the body of oil on the upper side of the piston readily forces the plunger 40 outwardly and permits a direct flow of the oil from the upper side of the piston through the by-pass 11 and into the lower end of the cylinder 8. By this means a single acting shock absorber is provided which effectively checks the rebound action of the spring but permits a free compression of the same.

When it is desired to provide a double acting shock absorber in which both the rebound and the compression action of the spring is checked, a collar such as the collar 49 shown in Fig. 4 is interposed between the plunger 40 and the head 15. Inasmuch as the collar in this position completely blocks the action of the plunger 40, the oil in passing in either direction through the by-pass 11 must pass through the restricted port 46 and past the adjusting screw or plug 48, and it therefore follows that both the upward and the downward movement of the piston 17 will be resisted by the body of oil being forced through this port. When, of course, the action of the plunger 40 is blocked by the collar 49 so as to provide a double acting shock absorber, it is necessary to provide an inflexible connection between the outer end of the arm 28 and the vehicle spring. Such a connecting arm may be of any usual and well-known construction.

For the purpose of rendering the repair of broken cables or the babbitt connection of the same with the operating arm 28 or spring structure more readily, a separate port 50 may be secured to the end of the arm 28 and the connection to the cable made on the part, as shown in Fig. 5. This part includes a horizontal part 51, having an opening and recess for the reception of the cable and babbitt as previously described, and an ear 52 which is penetrated by the threaded end 53 of the arm 28 and is secured thereto by a nut 54. Should the cable break, it is apparent that the cable end and the part 50 can be readily removed without disturbing the other parts of the absorber.

From the foregoing it is apparent that the present invention provides a simple and inexpensive shock absorber which effectively resists the rebound action of the spring and can be readily altered in its action so as to resist both the rebound and the compression action of the spring, it can be readily and quickly applied to cars now in use, and when so applied will operate efficiently and will not readily get out of adjustment or wear unduly under the constant service to which it is necessarily subjected.

I claim as my invention:—

1. A hydraulic shock absorber including a housing having a main cylinder, a secondary cylinder communicating with one end of said main cylinder and a by-pass connecting the opposite end of said main cylinder and said secondary cylinder, a piston arranged in said main cylinder, means for reciprocating said piston through motion derived from the vehicle spring, a plunger arranged in said secondary cylinder and fitting the walls thereof, said plunger being movable by the fluid pressure to block the flow of fluid through said by-pass during the movement of the piston in response to the rebound movement of said vehicle spring and to permit a free flow of fluid during the movement of said piston in response to the compression movement of said vehicle spring, said plunger being provided with a restricted passage extending therethrough and means for varying the effective size of said passage.

2. A hydraulic shock absorber including a housing having a main cylinder, a secondary cylinder communicating with one end of said main cylinder, and a by-pass connecting the opposite end of said main cylinder and said secondary cylinder, a piston arranged in said main cylinder, means for reciprocating said piston through motion derived from the vehicle spring, a plunger arranged in said secondary cylinder, said plunger being movable by the fluid pressure to block the flow of fluid in one direction through said by-pass and to permit a free flow of fluid in the opposite direction, said plunger being provided with a restricted passage extending therethrough, means for varying the effective size of said passage, and means for rendering said plunger immovable so as to retard the flow of fluid in either direction through said by-pass.

3. A hydraulic shock absorber including an enclosed housing having a main cylinder, a secondary cylinder communicating with one end of said main cylinder, and a by-pass connecting the opposite end of said main cylinder and said secondary cylinder, a piston in said main cylinder, means for reciprocating said piston through motion derived from the vehicle spring, a plunger in said secondary cylinder, said plunger being movable outwardly by the flow of fluid in the corresponding direction to permit a free flow of the liquid through said by-pass and being movable upon a reverse flow of the fluid to block the flow of fluid, said plunger being provided with a restricted passage extending therethrough, and means for rendering said plunger inoperative so as to retard the flow of fluid in both directions through said by-pass comprising a collar interposed between said plunger and the head of said secondary cylinder.

4. A hydraulic shock absorber including an enclosed housing having a main cylinder, a secondary cylinder extending outwardly from the upper end of said main cylinder, and a by-pass communicating with the lower end of said main cylinder and said secondary cylinder, a piston in said main cylinder, means for reciprocating said piston through motion derived from the vehicle spring, a plunger in said secondary cylinder, a spring yieldingly holding said plunger in its inward position, a shoulder limiting the inward movement of said plunger, said plunger being provided with a port between said main and secondary cylinders and a port between said secondary cylinder and said by-pass when said plunger is in its inward position, means for adjustably restricting the flow of fluid through said ports, said plunger being movable outwardly by the fluid pressure created to the compression movement of said vehicle spring to permit a direct flow of fluid from said main cylinder through said by-pass.

5. A hydraulic shock absorber including an enclosed housing having a main cylinder, a secondary cylinder extending outwardly from the upper end of said main cylinder, and a by-pass communicating with the lower end of said main cylinder and said secondary cylinder, a piston in said main cylinder, means for reciprocating said piston through motion derived from the vehicle spring, a plunger in said secondary cylinder, a spring yieldingly holding said plunger in its inward position, said plunger comprising a cylindrical wall, a head at the inner end of said wall and an internally threaded stem on said head, said stem being provided with a port between the interior of said plunger and said main cylinder, and said cylindrical wall being provided with a port registering with said by-pass in the inward position of said plunger, a screw plug in said stem and adjustably controlling the effective size of said first named port, said plunger being movable outwardly by a corresponding fluid pressure to permit a direct flow of fluid from said main cylinder through said by-pass.

6. A hydraulic shock absorber including an enclosed housing formed to provide a vertical main cylinder, a secondary cylinder communicating with the upper end of said main cylinder, and a by-pass between the lower end of said main cylinder and said secondary cylinder, a piston in said main cylinder, means for depressing and elevating said piston through motion derived from the rebound and compression movements of the vehicle spring, respectively, a plunger in said secondary cylinder, a spring yieldingly holding said plunger in its inward position, and a shoulder limiting its inward movement, said plunger including a head at its inner end, a cylindrical wall and an internally threaded stem projecting outwardly from said head, a port in said stem between said main cylinder and the interior of said secondary cylinder, a screw plug controlling the effective size of said port, and a second port in said wall and registering with said by-pass in the inward position of said plunger, whereby during a rebound movement of said piston the fluid is forced through said by-pass and ports in said plunger into the upper end of said main cylinder and during a compression movement of said piston the fluid forces said plunger outward and permits a direct flow of fluid from the upper end of said main cylinder, through said by-pass and into the lower end of said main cylinder.

In testimony whereof I hereby affix my signature.

VINCENT PATRICOLO.